(12) United States Patent
Allen et al.

(10) Patent No.: US 12,488,063 B2
(45) Date of Patent: Dec. 2, 2025

(54) GENERATING INPUT PROCESSING RULES ENGINES USING PROBABILISTIC CLUSTERING TECHNIQUES

(71) Applicant: UnitedHealth Group Incorporated, Minnetonka, MN (US)

(72) Inventors: Ryan M. Allen, Onalaska, WI (US); Anmol, Greater Noida (IN); Prashant Pathak, Benares (IN); Sebastian D. Perez, Smyrna, GA (US)

(73) Assignee: UNITEDHEALTH GROUP INCORPORATED, Minnetonka, MN (US)

( * ) Notice: Subject to any disclaimer, the term of this patent is extended or adjusted under 35 U.S.C. 154(b) by 936 days.

(21) Appl. No.: 17/557,946

(22) Filed: Dec. 21, 2021

(65) Prior Publication Data

US 2023/0064460 A1    Mar. 2, 2023

Related U.S. Application Data

(60) Provisional application No. 63/239,561, filed on Sep. 1, 2021.

(51) Int. Cl.
*G06F 18/231*    (2023.01)
*G06F 18/2115*    (2023.01)
*G06N 20/00*    (2019.01)

(52) U.S. Cl.
CPC ........ *G06F 18/231* (2023.01); *G06F 18/2115* (2023.01); *G06N 20/00* (2019.01)

(58) Field of Classification Search
CPC .... G06F 18/231; G06F 18/2115; G06N 20/00
See application file for complete search history.

(56) References Cited

U.S. PATENT DOCUMENTS

| 7,072,841 | B1 | 7/2006 | Pednault |
| 7,418,431 | B1 | 8/2008 | Nies et al. |
| 7,664,690 | B2 | 2/2010 | Dirnberger et al. |
| 8,762,180 | B2 | 6/2014 | Ghani et al. |
| 9,299,108 | B2 | 3/2016 | Diana et al. |

(Continued)

OTHER PUBLICATIONS

Bates, David W et al. "Big Data In Health Care—Using Analytics To Identify and Manage High-Risk and High-Cost Patients," Health Affairs, vol. 33, No. 7, Jul. 2014), pp. 1123-1131, DOI: 10.377/hlthaff.2014.0041.

(Continued)

*Primary Examiner* — Barbara M Level
(74) *Attorney, Agent, or Firm* — Alston & Bird LLP

(57) ABSTRACT

Various embodiments of the present invention provide methods, apparatus, systems, computing devices, computing entities, and/or the like for performing predictive data analysis. Certain embodiments of the present invention utilize systems, methods, and computer program products that perform predictive data analysis by generating input processing rules using at least one of general clusters generated using all of a set of prediction input data objects, high-confidence clusters generated using prediction input data objects having threshold-satisfying clustering confidence scores, and low-confidence clusters generated using prediction input data objects having non-threshold-satisfying clustering confidence scores.

20 Claims, 9 Drawing Sheets

(56) References Cited

U.S. PATENT DOCUMENTS

| | | | |
|---|---|---|---|
| 10,552,576 B2 | 2/2020 | Campbell | |
| 10,679,299 B2 | 6/2020 | Billings | |
| 11,593,716 B2* | 2/2023 | Sathe | G06F 18/24 |
| 11,769,063 B2* | 9/2023 | Sun | G06N 5/022 |
| | | | 706/45 |
| 2002/0107858 A1* | 8/2002 | Lundahl | G06F 18/23 |
| 2009/0281841 A1 | 11/2009 | Basak et al. | |
| 2013/0054259 A1 | 2/2013 | Wojtusiak et al. | |
| 2017/0075981 A1* | 3/2017 | Carlsson | H04L 41/0826 |
| 2017/0154374 A1 | 6/2017 | Iglesias et al. | |
| 2017/0220940 A1* | 8/2017 | Shaashua | G06F 16/35 |
| 2018/0089379 A1 | 3/2018 | Collins et al. | |
| 2018/0137433 A1* | 5/2018 | Devarakonda | G06N 5/022 |
| 2018/0254101 A1* | 9/2018 | Gilmore | G16H 15/00 |
| 2019/0155824 A1* | 5/2019 | Pallath | G06F 16/2465 |
| 2019/0180358 A1* | 6/2019 | Nandan | G06F 18/2113 |
| 2020/0372467 A1 | 11/2020 | Levy | |

OTHER PUBLICATIONS

Letham, Benjamin et al. "Interpretable Classifiers Using Rules and Bayesian Analysis: Building A Better Stroke Prediction Model," The Annals of Applied Statistics, vol. 9, No. 3, Apr. 2015, pp. 1350-1371, DOI: 10.1214/15-AOAS848.

\* cited by examiner

Claim Number: 122445

Recommended Next State: S1

IF specialty = 'chiropractic' AND
p.o.s. = 'Clinic' THEN $S_1$ probability: 95%

ELSE IF specialty = 'chiropractic' and
p.o.s. = 'Outpatient Surgery' THEN $S_2$ probability: 88%

ELSE $S_3$ probability: 75%

GENERATING INPUT PROCESSING RULES ENGINES USING PROBABILISTIC CLUSTERING TECHNIQUES

CROSS-REFERENCES TO RELATED APPLICATIONS

The present application claims priority to U.S. Provisional Patent Application No. 63/239,561 (filed on Sep. 1, 2021), which is incorporated by reference herein in its entirety.

BACKGROUND

Various embodiments of the present invention address technical challenges related to performing predictive data analysis. Various embodiments of the present invention address the shortcomings of existing predictive data analysis systems and disclose various techniques for efficiently and reliably performing predictive data analysis.

BRIEF SUMMARY

In general, embodiments of the present invention provide methods, apparatus, systems, computing devices, computing entities, and/or the like for performing predictive data analysis. Certain embodiments of the present invention utilize systems, methods, and computer program products that perform predictive data analysis by generating input processing rules using at least one of general clusters generated using all of a set of prediction input data objects, high-confidence clusters generated using prediction input data objects having threshold-satisfying clustering confidence scores, and low-confidence clusters generated using prediction input data objects having non-threshold-satisfying clustering confidence scores.

In accordance with one aspect, a method is provided. In one embodiment, the method comprises: identifying n general clusters of the plurality of prediction input data objects; for each prediction input data object: determining n general cluster association scores with respect to the n general clusters, determining a clustering confidence score for the prediction input data object based at least in part on a highest general cluster association score of the n general cluster association scores associated with the prediction input data object, and determining whether the prediction input data object is part of a high-confidence subset of the plurality of prediction input data objects based at least in part on whether the clustering confidence score for the prediction input data object satisfies a first clustering confidence score condition; identifying m high-confidence clusters of the high-confidence subset; determining a plurality of augmented clusters based at least in part on the n general clusters and the m high-confidence clusters; for each augmented cluster, determining an augmented cluster score; determining one or more filtered clusters of the plurality of augmented clusters based at least in part on each augmented cluster whose respective augmented cluster score satisfies an augmented cluster score condition; determining one or more input processing rules based at least in part on the one or more filtered clusters; and performing one or more prediction-based actions based at least in part on the one or more input processing rules.

In accordance with another aspect, a computer program product is provided. The computer program product may comprise at least one computer-readable storage medium having computer-readable program code portions stored therein, the computer-readable program code portions comprising executable portions configured to: identify n general clusters of the plurality of prediction input data objects; for each prediction input data object: determine n general cluster association scores with respect to the n general clusters, determine a clustering confidence score for the prediction input data object based at least in part on a highest general cluster association score of the n general cluster association scores associated with the prediction input data object, and determine whether the prediction input data object is part of a high-confidence subset of the plurality of prediction input data objects based at least in part on whether the clustering confidence score for the prediction input data object satisfies a first clustering confidence score condition; identify m high-confidence clusters of the high-confidence subset; determine a plurality of augmented clusters based at least in part on the n general clusters and the m high-confidence clusters; for each augmented cluster, determine an augmented cluster score; determine one or more filtered clusters of the plurality of augmented clusters based at least in part on each augmented cluster whose respective augmented cluster score satisfies an augmented cluster score condition; determine one or more input processing rules based at least in part on the one or more filtered clusters; and perform one or more prediction-based actions based at least in part on the one or more input processing rules.

In accordance with yet another aspect, an apparatus comprising at least one processor and at least one memory including computer program code is provided. In one embodiment, the at least one memory and the computer program code may be configured to, with the processor, cause the apparatus to: identify n general clusters of the plurality of prediction input data objects; for each prediction input data object: determine n general cluster association scores with respect to the n general clusters, determine a clustering confidence score for the prediction input data object based at least in part on a highest general cluster association score of the n general cluster association scores associated with the prediction input data object, and determine whether the prediction input data object is part of a high-confidence subset of the plurality of prediction input data objects based at least in part on whether the clustering confidence score for the prediction input data object satisfies a first clustering confidence score condition; identify m high-confidence clusters of the high-confidence subset; determine a plurality of augmented clusters based at least in part on the n general clusters and the m high-confidence clusters; for each augmented cluster, determine an augmented cluster score; determine one or more filtered clusters of the plurality of augmented clusters based at least in part on each augmented cluster whose respective augmented cluster score satisfies an augmented cluster score condition; determine one or more input processing rules based at least in part on the one or more filtered clusters; and perform one or more prediction-based actions based at least in part on the one or more input processing rules.

BRIEF DESCRIPTION OF THE DRAWINGS

Figure 1:
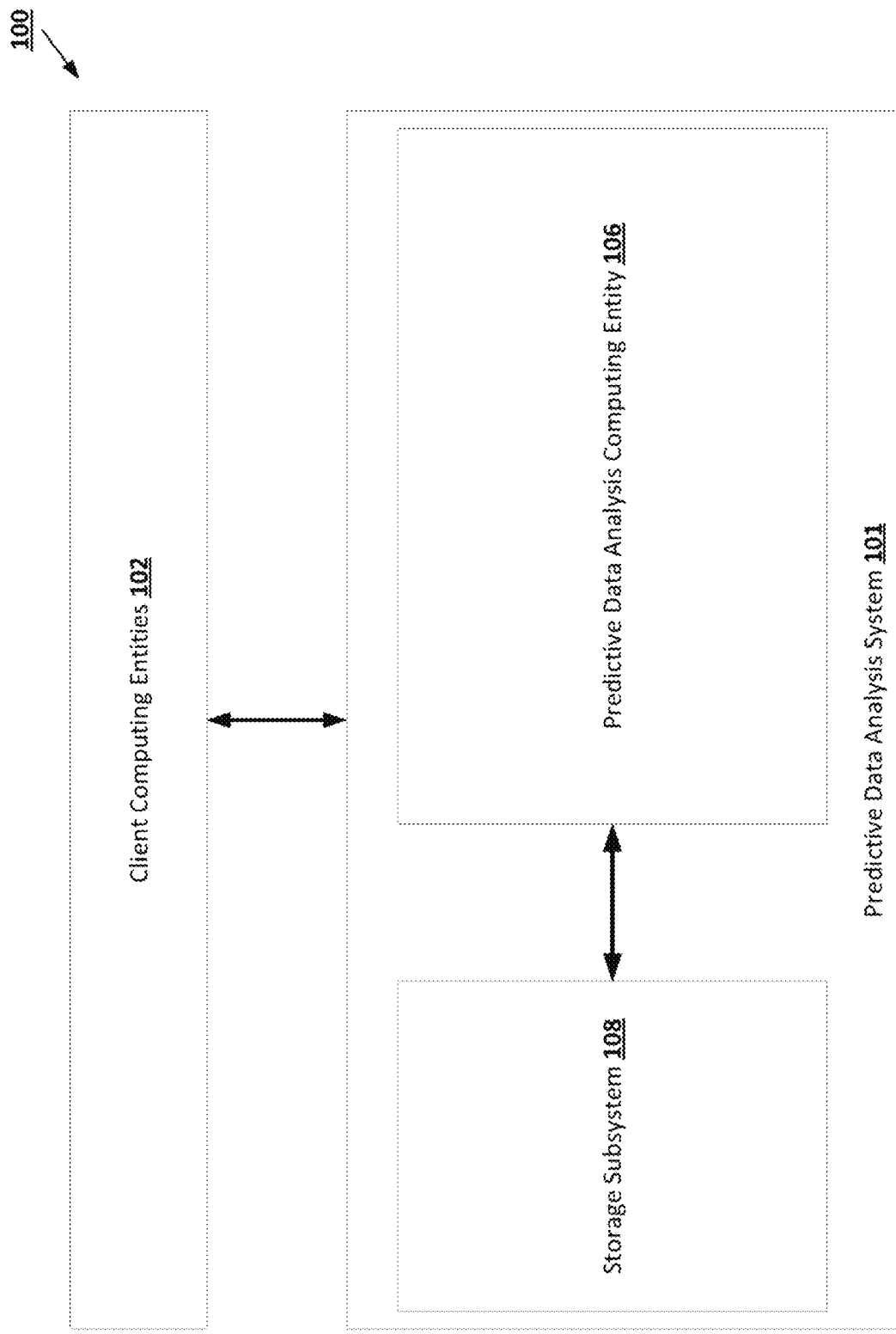

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
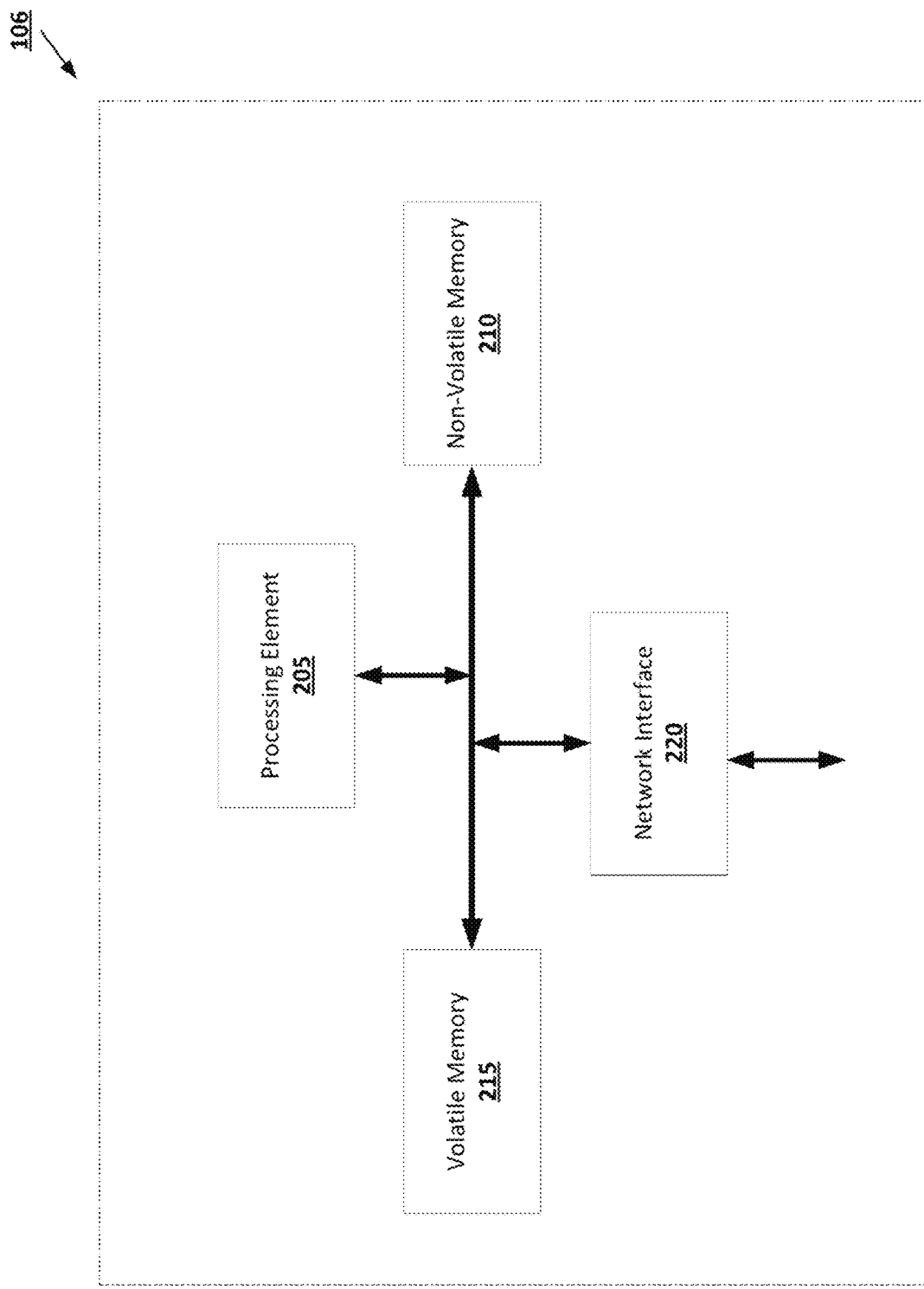

FIG. 2 provides an example predictive data analysis computing entity in accordance with some embodiments discussed herein.

Figure 3:
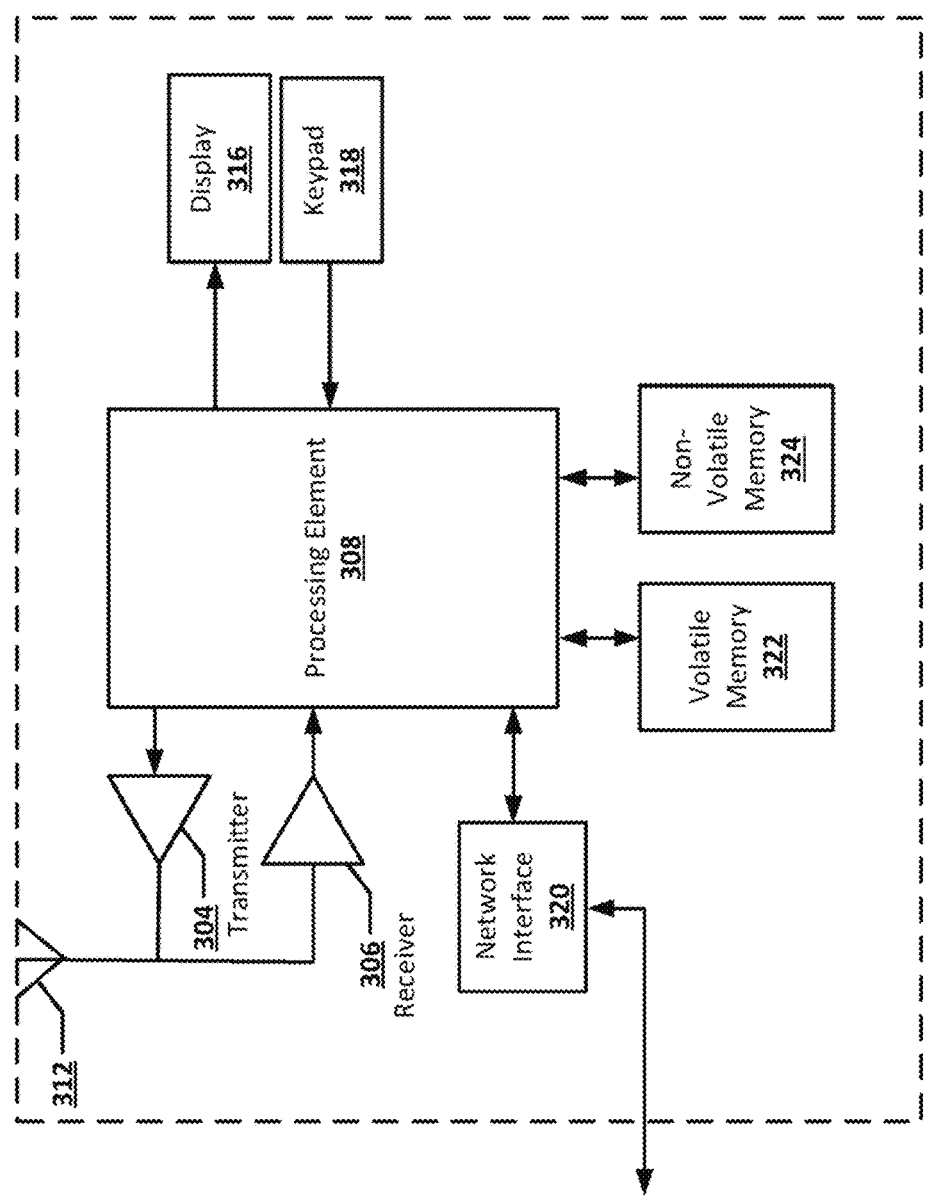

FIG. 3 provides an example external computing entity in accordance with some embodiments discussed herein.

Figure 4:
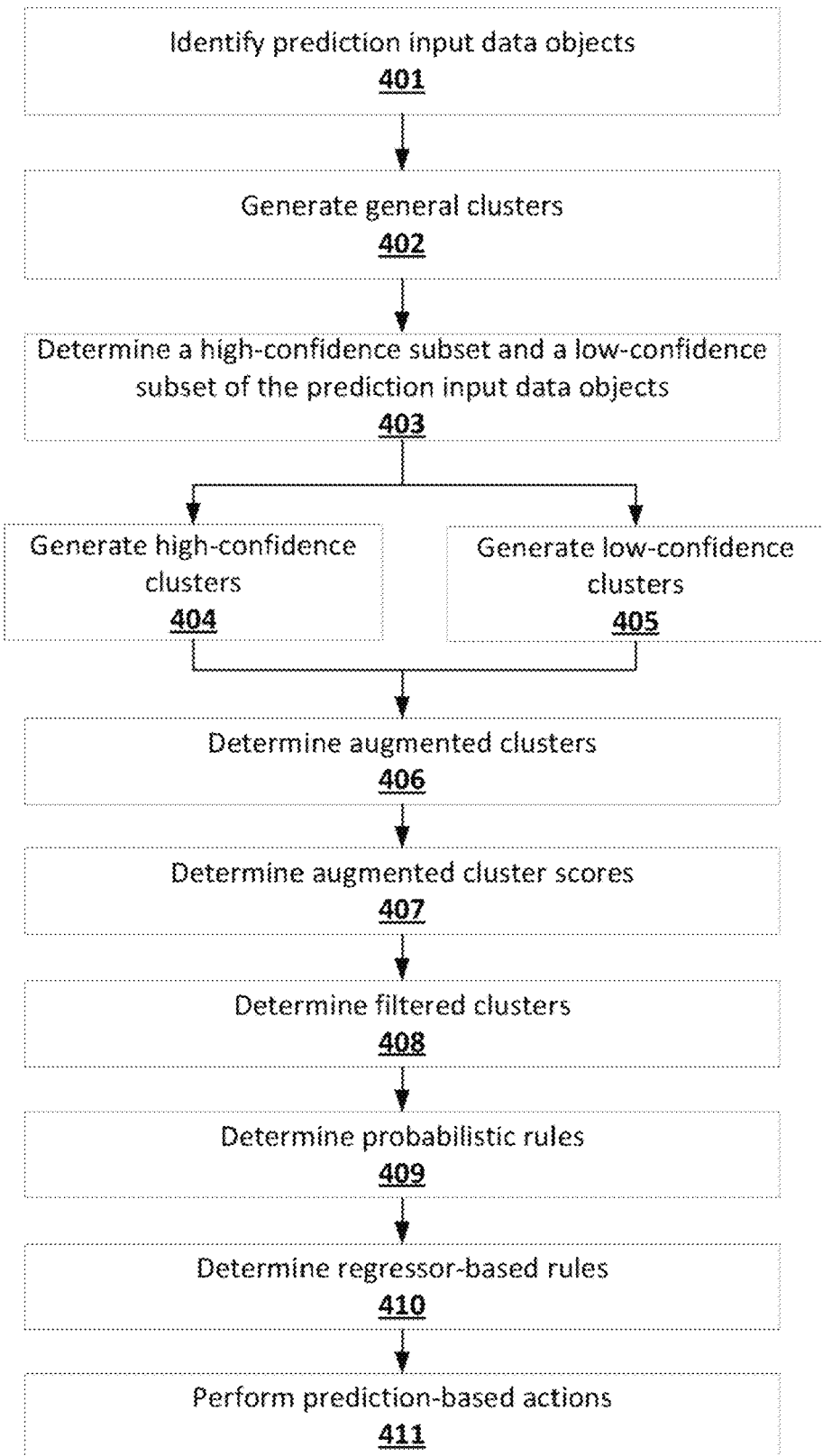

FIG. 4 is a flowchart diagram of an example process for generating a rules engine using one or more clustering techniques in accordance with some embodiments discussed herein.

Figure 5:
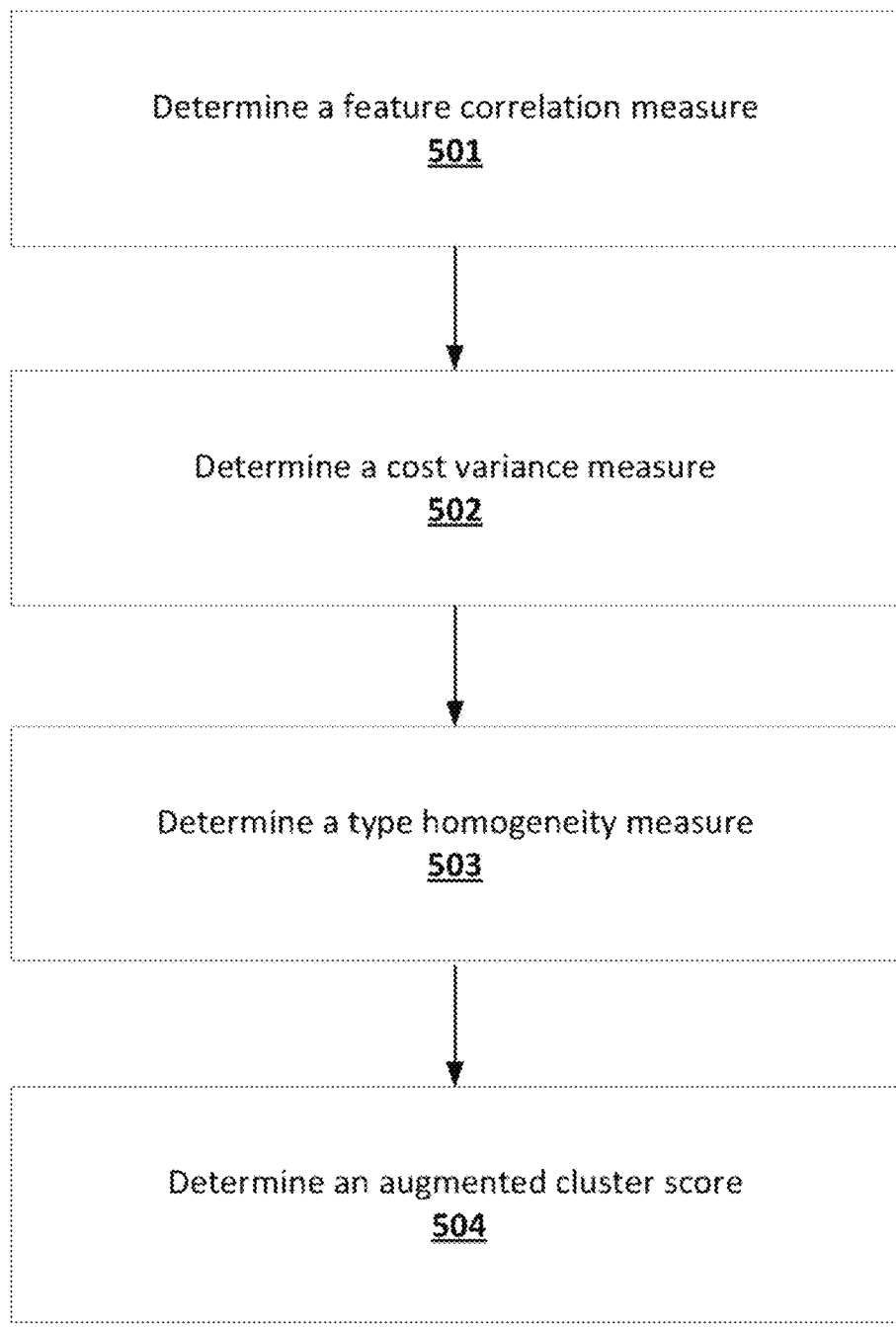

FIG. 5 is a flowchart diagram of an example process for determining the augmented cluster score for a particular augmented cluster score in accordance with some embodiments discussed herein.

FIG. 6 provides an operational example of input data used to generate augmented cluster scores for set of augmented clusters data in accordance with some embodiments discussed herein.

Figure 7:
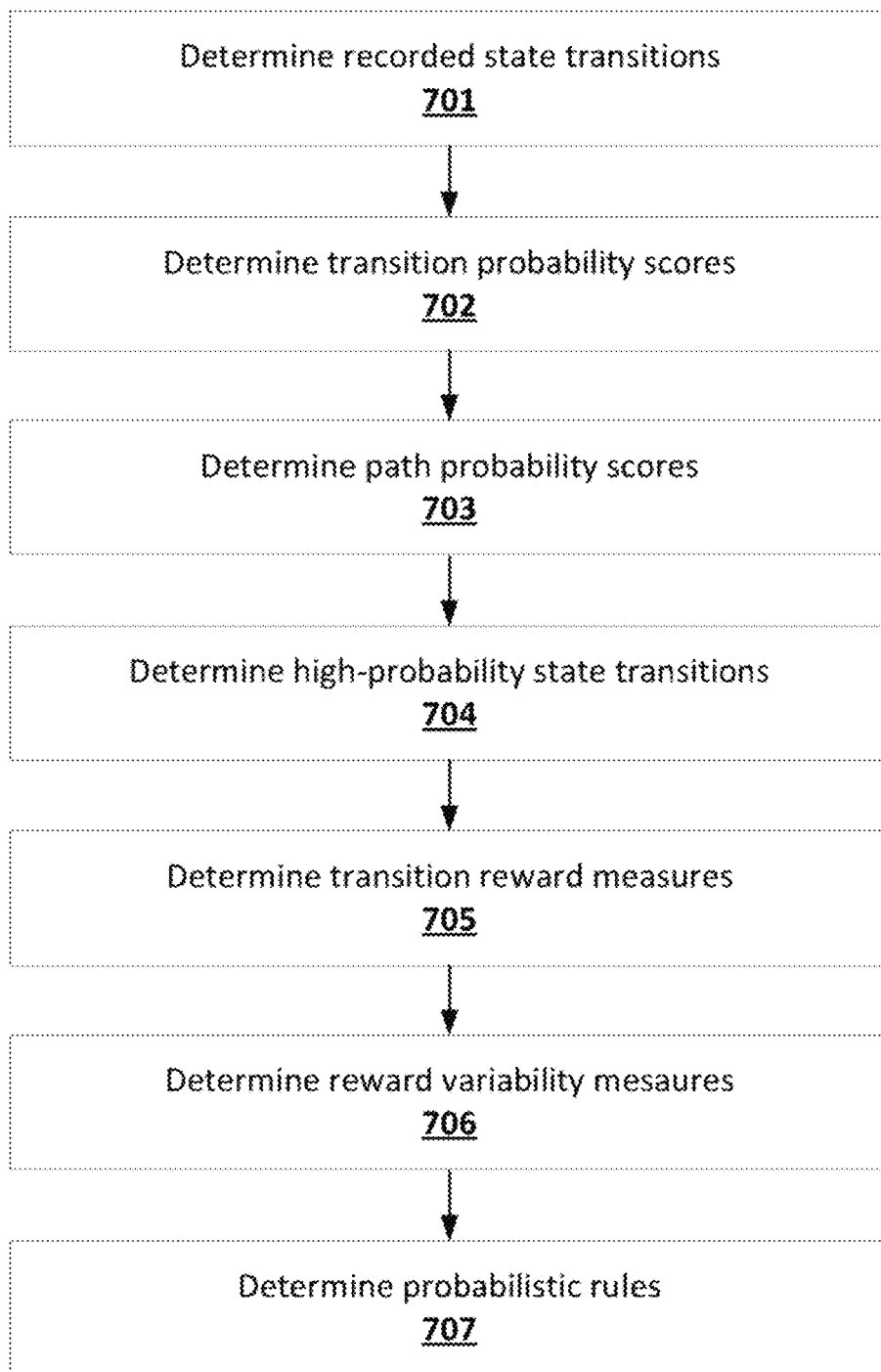

FIG. 7 is a flowchart diagram of an example process for determining a set of probabilistic rules based at least in part on a set of filtered clusters in accordance with some embodiments discussed herein.

Figure 8:
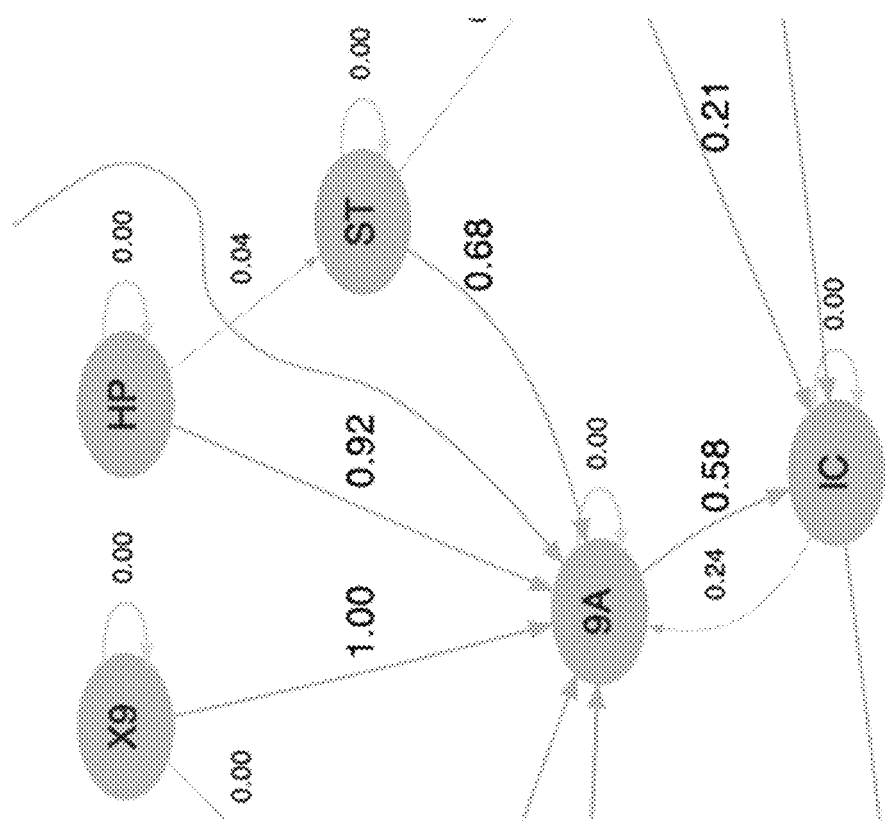

FIG. 8 provides an operational example of a state transition modeling graph in accordance with some embodiments discussed herein.

FIG. 9 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention address technical challenges associated with performing predictive data analysis operations using rules engines. Rules engines provide interpretable solutions for performing predictive data analysis that are often computationally superior to other predictive data analysis frameworks as they can perform predictive data analysis with linear computational complexity given a variable number of rules. However, creating such rules engines can be computationally costly and practically difficult. Accordingly, various embodiments of the present invention introduce techniques for generating rules engines using probabilistic clustering techniques. In doing so, various embodiments of the present invention introduce innovative solutions that improve computational efficiency and interpretability of performing predictive data analysis operations.

An example of the probabilistic techniques described herein include hierarchical clustering techniques that generate a set of augmented clusters including general clusters, high-confidence clusters, and low-confidence clusters. In some embodiments, because the set of augmented clusters include clusters generated based at least in part on all of the prediction input data objects, based at least in part on a high-confidence subset of the prediction input data objects having relatively higher cluster confidence scores, and based at least in part on a low-confidence subset of the prediction input data objects having relatively low cluster confidence scores, the set of augmented clusters captures variations across prediction input data objects as a whole as well as across subsets of prediction input data objects, where the subsets may be determined based at least in part on estimated measures of predictive insightfulness of the input feature data associated with the prediction input data objects in the noted subsets.

II. Definitions

The term "prediction input data object" may refer to a data construct that describes any collection of data describing a set of input features. In some embodiments, a prediction input data object may comprise an input feature set describing a set of input features and a utility measure such as a cost measure. An example of a prediction input data object may be a collection of data describing a set of input features corresponding to a set of claim attributes of a health insurance claim as well as a cost measure (e.g., a billed amount measure, a paid amount measure, and/or the like) associated with the health insurance claim. Another example of a prediction input data object may be a collection of data describing a set of input features corresponding to a set of patient attributes of a patient as well as a cost measure (e.g., a cost of care measure) associated with the patient.

The term "general cluster" may refer to a data construct that describes a general cluster describes a subset (e.g., a disjoint subset) of the prediction input data objects. In some embodiments, the clustering routine used to generate n general clusters is a probabilistic clustering routine that is configured to: (i) generate n general clusters for a multi-dimensional clustering space describing input features of a set of prediction input data objects, and (ii) for each object-cluster pair that comprises a general cluster of the n general clusters and a prediction input data object of the set of prediction input data objects, a general cluster association score that describes an estimated/predicted likelihood that the prediction input data object for the object-cluster pair is associated with the general cluster for the object-cluster pair. In some of the noted embodiments, given a prediction input data object that is associated with n general cluster association scores for n clusters, each of the n general cluster association scores describes an estimated/predicted likelihood that the prediction input data object is associated with the corresponding general cluster. In some embodiments, given a prediction input data object that is associated with n general cluster association scores with respect to the n general clusters, the prediction input data object is assigned to a general cluster of the n general clusters that has the highest corresponding general cluster association score of the n general cluster association scores. An example of a probabilistic clustering routine that may be used to generate general cluster association scores for prediction input data objects is a clustering routine that uses an expectation maximization technique via using Gaussian mixture models. In some of the noted embodiments, the number of Gaussians of the expectation maximization technique is determined based at least in part on a silhouette scores of cost measures associated with the prediction input data objects clustered using the clustering routine and/or based at least in part on type homogeneity measures for the prediction input data objects, and the covariance of the expectation maximization technique is determined in a manner such that all of the generated general clusters share the same covariance matrix.

The term "clustering confidence score" may refer to a data construct that describes an estimated/predicted degree of confidence in assignment of a general cluster to a corresponding prediction input data object. Because in some embodiments a general cluster that is associated with a highest general cluster association score is assigned to a prediction input data object, the clustering confidence score for the prediction input data object may in at least some embodiments be determined based at least in part on the highest general cluster association score that is associated with the assigned general cluster for the prediction input data object. For example, in some embodiments, the highest general cluster association score for a prediction input data object is directly adopted as the clustering confidence score for the prediction input data object. As another example, in some embodiments, the clustering confidence score for a prediction input data object is determined based at least in part on the output of performing the highest general cluster association score for the prediction input data object using one or more defined mathematical operations. As yet another example, in some embodiments, the clustering confidence score for a prediction input data object is determined based at least in part on the output of processing one or more features associated with the prediction input data object including the highest general cluster association score for the prediction input data object using a machine learning model. As a further example, in some embodiments, the clustering confidence score for a prediction input data object is determined based at least in part on the output of processing one or more features associated with the prediction input data object including the n general cluster association scores for the prediction input data object using a machine learning model.

The term "high-confidence cluster" may refer to a data construct that describes a general cluster describes a subset (e.g., a disjoint subset) of the prediction input data objects in the high-confidence subset. In some embodiments, the clustering routine used to generate the m high-confidence clusters is a probabilistic clustering routine that is configured to: (i) generate m high-confidence clusters for a multi-dimensional clustering space describing input features of a set of prediction input data objects in a high-confidence subset, and (ii) for each object-cluster pair that comprises a high-confidence cluster of the m high-confidence clusters and a prediction input data object of the set of prediction input data object, a high-confidence cluster association score that describes an estimated/predicted likelihood that the prediction input data object for the object-cluster pair is associated with the high-confidence cluster for the object-cluster pair. In some of the noted embodiments, given a prediction input data object in the high-confidence subset that is associated with m high-confidence cluster association scores for m high-confidence clusters, each of the m high-confidence cluster association scores describes an estimated/predicted likelihood that the prediction input data object is associated with the corresponding high-confidence cluster. In some embodiments, given a prediction input data object in the high-confidence subset that is associated with m high-confidence cluster association scores form high-confidence clusters, the prediction input data object is assigned to a high-confidence cluster of the m high-confidence clusters that has the highest corresponding high-confidence cluster association score of the m high-confidence cluster association scores. An example of a probabilistic clustering routine that may be used to generate high-confidence cluster association scores for prediction input data objects in a high-confidence subset is a clustering routine that uses an expectation maximization technique via using Gaussian mixture models. In some of the noted embodiments, the number of Gaussians of the expectation maximization technique is determined based at least in part on a silhouette scores of cost measures associated with the prediction input data objects clustered using the clustering routine and/or based at least in part on type homogeneity measures for the prediction input data objects, and the covariance of the expectation maximization technique is determined in a manner such that all of the generated high-confidence clusters share the same covariance matrix.

The term "low-confidence cluster" may refer to a data construct that describes a subset (e.g., a disjoint subset) of the prediction input data objects in the low-confidence subset. In some embodiments, the clustering routine used to generate the k low-confidence clusters is a probabilistic clustering routine that is configured to: (i) generate k low-confidence clusters for a multi-dimensional clustering space describing input features of a set of prediction input data objects in a low-confidence subset, and (ii) for each object-cluster pair that comprises a low-confidence cluster of the k low-confidence clusters and a prediction input data object of the set of prediction input data object, a low-confidence cluster association score that describes an estimated/predicted likelihood that the prediction input data object for the object-cluster pair is associated with the low-confidence cluster for the object-cluster pair. In some of the noted embodiments, given a prediction input data object in the low-confidence subset that is associated with k low-confidence cluster association scores fork low-confidence clusters, each of the k low-confidence cluster association scores describes an estimated/predicted likelihood that the prediction input data object is associated with the corresponding low-confidence cluster. In some embodiments, given a prediction input data object in the low-confidence subset that is associated with k low-confidence cluster association scores for k low-confidence clusters, the prediction input data object is assigned to a low-confidence cluster of the k low-confidence clusters that has the lowest corresponding low-confidence cluster association score of the k low-confidence cluster association scores. An example of a probabilistic clustering routine that may be used to generate low-confidence cluster association scores for prediction input data objects in a low-confidence subset is a clustering routine that uses an expectation maximization technique via using Gaussian mixture models. In some of the noted embodiments, the number of Gaussians of the expectation maximization technique is determined based at least in part on a silhouette scores of cost measures associated with the prediction input data objects clustered using the clustering routine and/or based at least in part on type homogeneity measures for the prediction input data objects, and the covariance of the expectation maximization technique is determined in a manner such that all of the generated low-confidence clusters share the same covariance matrix.

The term "augmented cluster score" may refer to a data construct that describes an estimated/predicted likelihood that state transition data associated with the prediction input data objects in the augmented cluster include patterns that will be of interest in generating input processing rules. In some embodiments, the augmented cluster score for an augmented cluster score is determined based at least in part on at least one of: (i) a feature correlation measure for the augmented cluster score, (ii) a cost variance measure for the augmented cluster score, and (iii) a type homogeneity measure for the augmented cluster. In some embodiments, the augmented cluster score for an augmented cluster score is determined based at least in part on the output of a machine learning model that is configured to process a feature correlation measure for the augmented cluster score, a cost variance measure for the augmented cluster score, and a type homogeneity measure for the augmented cluster. In some embodiments, the augmented cluster score for the particular augmented cluster is a binary score that has an affirmative value if all three of the following conditions are satisfied and has a negative value otherwise: (i) the feature correlation measure for the particular augmented cluster score is among the type ath (e.g., $90^{th}$) percentile of the feature correlation measures for all augmented clusters, (ii) the cost variance measure for the particular augmented cluster score is among the type bth (e.g., $60^{th}$) percentile of the cost variance measures for all augmented clusters, and (iii) the type homogeneity measure for the particular augmented cluster is among the type cth (e.g., $75^{th}$) percentile of the type homogeneity measures for all augmented clusters. As another example, in some embodiments, the augmented cluster score for the particular augmented cluster is a binary score that has an affirmative value if at least x of the following conditions are satisfied and has a negative value otherwise: (i) the feature correlation measure for the particular augmented cluster score is among the type ath (e.g., $90^{th}$) percentile of the feature correlation measures for all augmented clusters, (ii) the cost variance measure for the particular augmented cluster score is among the type bth (e.g., $60^{th}$) percentile of the cost variance measures for all augmented clusters, and (iii) the type homogeneity measure for the particular augmented cluster is among the type cth (e.g., $75^{th}$) percentile of the type homogeneity measures for all augmented clusters.

The term "feature correlation measure" may refer to a data construct that describes an estimated/predicted likelihood that assignment of the augmented cluster score to a prediction input data object describes a cost measure associated with the prediction input data object. For example, in some embodiments, to determine the feature correlation measure for an augmented cluster, a predictive data analysis computing entity first generates a random forest regressor machine learning model describing a set of decision trees, where each decision tree relates a set of features each describing assignment of an augmented cluster score to a prediction input data object to a cost measure classification for the prediction input data object. Afterward, the predictive data analysis computing entity may generate an $R^2$ score for each augmented cluster based at least in part on the set of decision trees, and then determines the feature correlation measure for each augmented cluster based at least in part on the $R^2$ score for the augmented cluster.

The term "cost variance measure" may refer to a data construct that describes variation of cost measures associated with a corresponding augmented cluster that may be determined based at least in part on one or more statistical distribution measures of cost measures associated with the corresponding augmented cluster. Examples of statistical distribution measures include centroid measures (e.g., mean measures, median measures, and/or the like), standard deviation measures, variance measures, mode measures, and/or the like. In some embodiments, the cost variance measure for an augmented cluster may be determined based at least in part on a ratio of: (i) a standard deviation of cost measures associated with the prediction input data objects to which the augmented cluster is assigned, and (ii) a mean of cost measures associated with the prediction input data objects to which the augmented cluster is assigned.

The term "type homogeneity measure" may refer to a data construct that describes an estimated/predicted degree of homogeneity in input types of prediction input data objects in the particular augmented cluster. In some embodiments, to determine the type homogeneity measure for a particular augmented cluster, a predictive data analysis computing entity first determines an input type for each prediction input data object (e.g., a procedure type for each health insurance claim, a procedure code for each health insurance claim, a procedure group for each health insurance claim, and/or the like). Afterwards, the predictive data analysis computing entity 106 may determine the type homogeneity measure for the particular augmented cluster based at least in part on at least one input type frequency for at least one input type associated with the prediction input data object of the particular augmented cluster. In some embodiments, a predictive data analysis computing entity may determine the type homogeneity measure for the particular augmented cluster based at least in part on a ratio of: (i) a count of prediction input data objects associated with the particular augmented cluster that are associated with a most frequent input type, and (ii) a total count of prediction input data objects associated with the particular augmented cluster. In an exemplary embodiment, given an augmented cluster that is associated with a first health insurance claim having the procedure group P1, a second health insurance claim having the procedure group P2, and a third health insurance claim having the procedure group P1, the type homogeneity measure for the particular augmented cluster may be determined based at least in part on $2/3$.

The term "probabilistic rule" may refer to a data construct that describes an input processing rule that describes a likelihood that satisfaction of one or more conditions defined by one or more input feature values will lead to transition to a defined operational state (e.g., a defined business process stage, a defined business process interception, a defined pend code, and/or the like). For example, an example of an logical if-statement describing three probabilistic rules is: IF specialty='chiropractic' AND p.o.s.='Clinic' THEN $S_1$ probability: 95%, ELSE IF specialty='chiropractic' and p.o.s.='Outpatient Surgery' THEN $S_2$ probability: 88%, ELSE $S_3$ probability: 75%, where each S factor is a defined operational state. In some embodiments, to determine probabilistic rules based at least in part on a filtered cluster, data related to recorded state transitions of the prediction input data objects are modeled using a Markov chain model to identify high-probability state transitions, then a transition reward measure is determined for each high-probability state transition by computing solutions to a linear equation model that relates high-probability state transitions to transition reward measures for the high-probability state transitions, then high-variability operational states are determined based at least in part on the transition reward measures, and then transition reward measures for the defined operational transitions associated with the high-variability operational states are processed using a Bayesian rules list introspection model to generate the probabilistic rules.

The term "recorded state transition path" may refer to a data construct that describes a sequence of one or more continuous state transitions performed by at least prediction input data object that is in a filtered cluster. For example, a recorded state transition may describe that a subset of prediction input data objects modeled by a filtered cluster have transitioned from a defined operational state $S_1$ to a defined operational state $S_2$, then from the defined operational state $S_2$ to a defined operational state $S_3$, and then from the defined operational state $S_1$ to a defined operational state $S_4$. In some embodiments, each recorded state transition path is associated with an initial operational state (e.g., the defined operational state $S_1$ in the preceding example), a terminal operational state (e.g., the defined operational state $S_4$ in the preceding example), a sequence of recorded state transitions that are referred to as the path-specific subset of defined state transitions for the recorded state transition path (e.g., the recorded state transition $S_1 \rightarrow S_2$, the recorded state transition $S_2 \rightarrow S_3$, and the recorded state transition $S_3 \rightarrow S_4$ in the preceding example). Accordingly, in some embodiments, a recorded state transition path describes that at least one prediction input data object in a filtered cluster has been recorded to have transitioned from an initial operational state of a plurality of defined operational states to a terminal operational state of the plurality of defined operational states via a path-specific transition subset of a plurality of defined state transitions, where each defined state transition is a defined direct transition from a first operational state (e.g., the defined operational state $S_1$ for the recorded state transition $S_1 \rightarrow S_2$ in the preceding example) of the plurality of defined operational states to a second operational state (e.g., the defined operational state $S_2$ for the recorded state transition $S_1 \rightarrow S_2$ in the preceding example) of the plurality of defined operational states.

The term "transition probability score" may refer to a data construct that describes an estimated/predicted likelihood that a prediction input data object in a first operational state that is associated with a corresponding defined state transition for the probability score transitions to the second operational state that is associated with the corresponding defined state transition. For example, the transition probability score for a defined state transition that describes a direct transition from a first defined operational state to a second defined operational state may describe an observed/computed ratio of: (i) a count of a first subset of a set of prediction input data objects that have been recorded to be at the first defined operational state, and (ii) a count of a subset of the first subset that have been recorded to have directly transitioned from the first defined operational state to the second operational state. As another example, the transition probability score for a defined state transition that describes a direct transition from a first defined operational state to a second defined operational state may describe an observed/computed ratio of: (i) a count of instances in which a set of prediction input data objects have been recorded to be at the first defined operational state, and (ii) a count of a subset of the noted instances in which a direct transition to the second defined operational state has been performed.

The term "path probability score" may refer to a data construct that describes an estimated/predicted likelihood that a prediction input data object in an initial operational state of a corresponding recorded state transition will transition to a terminal operational state of the corresponding recorded state transition via the defined state transitions in the path-specific transition subset for the corresponding recorded transition path. In some embodiments, the transition probability score for a corresponding recorded state transition may be calculated by combining (e.g., multiplying, computing a joint probability of, and/or the like) the transition probability scores for the defined state transitions in the path-specific transition subset for the corresponding recorded transition path. For example, given p defined state transitions in a path-specific transition subset for a corresponding recorded transition path which are associated with p corresponding transition reward measures, embodiments, the transition probability score for the corresponding recorded state transition may be calculated by combining (e.g., multiplying, computing a joint probability of, and/or the like) the p transition probability scores for the p defined state transitions in the path-specific transition subset for the corresponding recorded transition path.

The term "transition reward measure" may refer to a data construct that describes an estimated/computed utility ratio (e.g., cost/value ratio) for a high-probability state transition. In some embodiments, the transition reward measure for a high-probability state transition using a system of equations, for example the system of equations characterized by the equations: $X_1=S_1 \rightarrow S_2$, $X_2=S_2 \rightarrow S_3$, $X_3=S_3 \rightarrow S_4$, $X_4=S_1 \rightarrow S_3$, $X_n=S_{n-1} \rightarrow S_n$, $X_1+X_2+X_n=X_1$, $X_4+X_3=Y_2$, $X_1+X_2+X_3+X_4=Y_3$, where each S factor is a defined operational state, each X factor is a transition reward measure for a defined state transition, and each Y factor is a reward measure for a state transition path.

The term "reward variability measure" may refer to a data construct that describes a measure of variability of transition reward measures for an originating subset of a set of more high-probability state transitions that originate from a defined operational state. For example, if a defined operational state is associated with v high-probability state transitions that originate from the defined operational state (i.e., if the defined operational state is the first operational state for v defined state transitions that are determined to have a threshold-satisfying transition probability scores), then the reward variability measure for the defined operational state may describe a measure of variability (e.g., a variance measure, a standard deviation measure, and/or the like) of the v corresponding transition reward measures for the noted v defined state transitions.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing health-related predictive data analysis. The architecture 100 includes a predictive data analysis system 101 configured to receive health-related predictive data analysis requests from external computing entities 102, process the predictive data analysis requests to generate predictions, provide the generated predictions to the external computing entities 102, and automatically perform prediction-based actions based at least in part on the predictions. Examples of predictions include generating input processing rules, such as health insurance claim input processing rules.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate predictions corresponding to the predictive data analysis requests, provide the predictions to the external computing entities 102, and automatically perform prediction-based actions based at least in part on the generated predictions.

The storage subsystem 108 may be configured to store input data used by the predictive data analysis computing entity 106 to perform health-related predictive data analysis as well as model definition data used by the predictive data analysis computing entity 106 to perform various health-related predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention address technical challenges associated with performing predictive data analysis operations using rules engines. Rules engines provide interpretable solutions for performing predictive data analysis that are often computationally superior to other predictive data analysis frameworks as they can perform predictive data analysis with linear computational complexity given a variable number of rules. However, creating such rules engines can be computationally costly and practically difficult. Accordingly, various embodiments of the present invention introduce techniques for generating rules engines using probabilistic clustering techniques. In doing so, various embodiments of the present invention introduce innovative solutions that improve computational efficiency and interpretability of performing predictive data analysis operations.

FIG. 4 is a flowchart diagram of an example process 400 for generating a rules engine using one or more clustering techniques. Via the various steps/operations of the process 400, the predictive data analysis computing entity 106 can use clustering techniques to generate augmented clusters, perform filtering operations on the augmented clusters to generate filtered clusters, and generate processing rules based at least in part on the filtered clusters. However, while various embodiments of the present invention describe the cluster generation operations, the cluster filtering operations, and the rule generation operations of the present invention as being performed by a single computing entity, a person of ordinary skill in the relevant technology will recognize that each of the three noted operation sets may be performed by one or more computing entities, such as by one or more distinct computing entities. Moreover, each combination of one or more of the described operation sets can be performed without the other operation sets. For example, the rule generation operations can be performed using clusters filtered based at least in part on different clustering techniques and/or using unfiltered clusters.

The process 400 begins at step/operation 401 when the predictive data analysis computing entity 106 identifies (e.g., receives) a set of prediction input data objects. A prediction input data object may be any collection of data describing a set of input features. In some embodiments, a prediction input data object may comprise an input feature set describing a set of input features and a utility measure such as a cost measure. An example of a prediction input data object may be a collection of data describing a set of input features corresponding to a set of claim attributes of a health insurance claim as well as a cost measure (e.g., a billed amount measure, a paid amount measure, and/or the like) associated with the health insurance claim. Another example of a prediction input data object may be a collection of data describing a set of input features corresponding to a set of patient attributes of a patient as well as a cost measure (e.g., a cost of care measure) associated with the patient.

In some embodiments, given an input set of attributes, generating a prediction input data object corresponding to the set of attributes comprises: (i) generating a set of intermediate input features based at least in part on the set of attributes, and (ii) performing dimensionality reduction on the set of intermediate input features to generate the set of input features described by the input feature set of the prediction input data object. In some embodiments, the intermediate input feature corresponding to a numeric attribute may directly describe the numeric attribute and/or may be determined based at least in part on the output of performing defined mathematical operations on the numeric attribute. In some embodiments, the intermediate input feature corresponding to a categorical attribute (e.g., an attribute describing a diagnosis code such as an International Classification of Diseases (ICD) code including an ICD-10 code, an attribute describing a procedure code such as Current Procedure Terminology (CPT) code, an attribute describing a pharmacy code, and/or the like) may be determined by processing feature data (e.g., textual description data) associated with the categorical attribute using an embedding machine learning model (e.g., an embedding machine learning model that includes an embedding layer such as a Paragraph2Vec embedding layer followed by one or more fully connected neural network layers such as layers of 100 rectified linear unit nodes and a dense sigmoid output layer with nodes equal to the number of potential categorical attributes attribute values) to generate an embedding of the categorical attribute and determining the intermediate input feature corresponding to the categorical attribute based at least in part on the generated embedding. In some embodiments, performing dimensionality reduction on a set of intermediate input features to generate a set of input features comprises: (i) performing principal component analysis operations on the intermediate input features generated based at least in part on numeric attributes to generate a first subset of the input features, (ii) performing multi-factor analysis (e.g., using an inertia value of 70%) on the intermediate input features generated based at least in part on categorical attributes to generate a second subset of the input features, and (iii) generating the input features based at least in part on the first subset and the second subset.

At step/operation 402, the predictive data analysis computing entity 106 generates n general clusters based at least in part on the prediction input data objects, where each general cluster describes a subset (e.g., a disjoint subset) of the prediction input data objects. In some embodiments, to generate the n general clusters, the predictive data analysis computing entity 106 first maps each prediction input data object to a multi-dimensional clustering space characterized by the input features associated with the prediction input data object, and then processes the multi-dimensional clustering space using a clustering routine in order to generate the n general clusters. In some embodiments, n is a hyper-parameter of the predictive data analysis computing entity 106 which is defined by predefined configuration metadata for the predictive data analysis computing entity 106. An exemplary value for the hyper-parameter n is seven.

In some embodiments, the clustering routine used to generate n general clusters is a probabilistic clustering routine that is configured to: (i) generate n general clusters for a multi-dimensional clustering space describing input features of a set of prediction input data objects, and (ii) for each object-cluster pair that comprises a general cluster of the n general clusters and a prediction input data object of the set of prediction input data objects, a general cluster association score that describes an estimated/predicted likelihood that the prediction input data object for the object-cluster pair is associated with the general cluster for the object-cluster pair. In some of the noted embodiments, given a prediction input data object that is associated with n general cluster association scores for n clusters, each of the n general cluster association scores describes an estimated/predicted likelihood that the prediction input data object is associated with the corresponding general cluster. In some embodiments, given a prediction input data object that is associated with n general cluster association scores with respect to the n general clusters, the prediction input data object is assigned to a general cluster of the n general clusters that has the highest corresponding general cluster association score of the n general cluster association scores.

An example of a probabilistic clustering routine that may be used to generate general cluster association scores for prediction input data objects is a clustering routine that uses an expectation maximization technique via using Gaussian mixture models. In some of the noted embodiments, the number of Gaussians of the expectation maximization technique is determined based at least in part on a silhouette scores of cost measures associated with the prediction input data objects clustered using the clustering routine and/or based at least in part on type homogeneity measures for the prediction input data objects, and the covariance of the expectation maximization technique is determined in a manner such that all of the generated general clusters share the same covariance matrix.

At step/operation 403, the predictive data analysis computing entity 106 determines a high-confidence subset of the prediction input data objects and a low-confidence subset of the prediction input data objects. In some embodiments, to determine whether a prediction input data object is part of the high-confidence subset, the predictive data analysis computing entity 106: (i) determines a clustering confidence score for the prediction input data object based at least in part on the highest general cluster association score of the n general cluster association scores associated with the prediction input data object (e.g., adopts the highest general cluster association score for the prediction input data object as the clustering confidence score for the prediction input data object), and (ii) determines that prediction input data object is part of the high-confidence subset if the clustering confidence score for the prediction input data object satisfies a first clustering confidence score condition (e.g., exceeds 99% of the upper-bound of the allowable range for clustering confidence scores, exceeds or is equal to 99% of the upper-bound of the allowable range for clustering confidence scores, and/or the like). In some embodiments, to determine whether a prediction input data object is part of the low-confidence subset, the predictive data analysis computing entity 106: (i) determines a clustering confidence score for the prediction input data object based at least in part on the highest general cluster association score of the n general cluster association scores associated with the prediction input data object (e.g., adopts the highest general cluster association score for the prediction input data object as the clustering confidence score for the prediction input data object), and (ii) determines that prediction input data object is part of the low-confidence subset if the clustering confidence score for the prediction input data object satisfies a second clustering confidence score condition (e.g., falls below 99% of the upper-bound of the allowable range for clustering confidence scores, falls below or is equal to 99% of the upper-bound of the allowable range for clustering confidence scores, and/or the like).

In some embodiments, a clustering confidence score may describe a degree of confidence in assignment of a general cluster to a corresponding prediction input data object. Because in some embodiments a general cluster that is associated with a highest general cluster association score is assigned to a prediction input data object, the clustering confidence score for the prediction input data object may in at least some embodiments be determined based at least in part on the highest general cluster association score that is associated with the assigned general cluster for the prediction input data object. For example, in some embodiments, the highest general cluster association score for a prediction input data object is directly adopted as the clustering confidence score for the prediction input data object. As another example, in some embodiments, the clustering confidence score for a prediction input data object is determined based at least in part on the output of performing the highest general cluster association score for the prediction input data object using one or more defined mathematical operations. As yet another example, in some embodiments, the clustering confidence score for a prediction input data object is determined based at least in part on the output of processing one or more features associated with the prediction input data object including the highest general cluster association score for the prediction input data object using a machine learning model. As a further example, in some embodiments, the clustering confidence score for a prediction input data object is determined based at least in part on the output of processing one or more features associated with the prediction input data object including the n general cluster association scores for the prediction input data object using a machine learning model.

At step/operation 404, the predictive data analysis computing entity 106 generates m high-confidence clusters based at least in part on the prediction input data objects in the high-confidence subset, where each high-confidence cluster describes a subset (e.g., a disjoint subset) of the prediction input data objects in the high-confidence subset. In some embodiments, to generate the m high-confidence clusters, the predictive data analysis computing entity 106 first maps each prediction input data object in the high-confidence subset to a multi-dimensional clustering space characterized by the input features associated with the prediction input data object, and then processes the multi-dimensional clustering space using a clustering routine in order to generate the m high-confidence clusters. In some embodiments, m is a hyper-parameter of the predictive data analysis computing entity 106 which is defined by predefined configuration metadata for the predictive data analysis computing entity 106. An exemplary value for the hyper-parameter m is seven.

In some embodiments, the clustering routine used to generate the m high-confidence clusters is a probabilistic clustering routine that is configured to: (i) generate m high-confidence clusters for a multi-dimensional clustering space describing input features of a set of prediction input data objects in a high-confidence subset, and (ii) for each object-cluster pair that comprises a high-confidence cluster of the m high-confidence clusters and a prediction input data object of the set of prediction input data object, a high-confidence cluster association score that describes an estimated/predicted likelihood that the prediction input data object for the object-cluster pair is associated with the high-confidence cluster for the object-cluster pair. In some of the noted embodiments, given a prediction input data object in the high-confidence subset that is associated with m high-confidence cluster association scores for m high-confidence clusters, each of the m high-confidence cluster association scores describes an estimated/predicted likelihood that the prediction input data object is associated with the corresponding high-confidence cluster. In some embodiments, given a prediction input data object in the high-confidence subset that is associated with m high-confidence cluster association scores for m high-confidence clusters, the prediction input data object is assigned to a high-confidence cluster of the m high-confidence clusters that has the highest corresponding high-confidence cluster association score of the m high-confidence cluster association scores.

An example of a probabilistic clustering routine that may be used to generate high-confidence cluster association scores for prediction input data objects in a high-confidence subset is a clustering routine that uses an expectation maximization technique via using Gaussian mixture models. In some of the noted embodiments, the number of Gaussians of the expectation maximization technique is determined based at least in part on a silhouette scores of cost measures associated with the prediction input data objects clustered using the clustering routine and/or based at least in part on type homogeneity measures for the prediction input data objects, and the covariance of the expectation maximization technique is determined in a manner such that all of the generated high-confidence clusters share the same covariance matrix.

At step/operation 405, the predictive data analysis computing entity 106 generates k low-confidence clusters based at least in part on the prediction input data objects in the low-confidence subset, where each low-confidence cluster describes a subset (e.g., a disjoint subset) of the prediction input data objects in the low-confidence subset. In some embodiments, to generate the k low-confidence clusters, the predictive data analysis computing entity 106 first maps each prediction input data object in the low-confidence subset to a multi-dimensional clustering space characterized by the input features associated with the prediction input data object, and then processes the multi-dimensional clustering space using a clustering routine in order to generate the k low-confidence clusters. In some embodiments, k is a hyper-parameter of the predictive data analysis computing entity 106 which is defined by predefined configuration metadata for the predictive data analysis computing entity 106. An exemplary value for the hyper-parameter k is seven.

In some embodiments, the clustering routine used to generate the k low-confidence clusters is a probabilistic clustering routine that is configured to: (i) generate k low-confidence clusters for a multi-dimensional clustering space describing input features of a set of prediction input data objects in a low-confidence subset, and (ii) for each object-cluster pair that comprises a low-confidence cluster of the k low-confidence clusters and a prediction input data object of the set of prediction input data object, a low-confidence cluster association score that describes an estimated/predicted likelihood that the prediction input data object for the object-cluster pair is associated with the low-confidence cluster for the object-cluster pair. In some of the noted embodiments, given a prediction input data object in the low-confidence subset that is associated with k low-confidence cluster association scores fork low-confidence clusters, each of the k low-confidence cluster association scores describes an estimated/predicted likelihood that the prediction input data object is associated with the corresponding low-confidence cluster. In some embodiments, given a prediction input data object in the low-confidence subset that is associated with k low-confidence cluster association scores for k low-confidence clusters, the prediction input data object is assigned to a low-confidence cluster of the k low-confidence clusters that has the lowest corresponding low-confidence cluster association score of the k low-confidence cluster association scores.

An example of a probabilistic clustering routine that may be used to generate low-confidence cluster association scores for prediction input data objects in a low-confidence subset is a clustering routine that uses an expectation maximization technique via using Gaussian mixture models. In some of the noted embodiments, the number of Gaussians of the expectation maximization technique is determined based at least in part on a silhouette scores of cost measures associated with the prediction input data objects clustered using the clustering routine and/or based at least in part on type homogeneity measures for the prediction input data objects, and the covariance of the expectation maximization technique is determined in a manner such that all of the generated low-confidence clusters share the same covariance matrix.

At step/operation 406, the predictive data analysis computing entity 106 determines a set of augmented clusters based at least in part on the n general clusters, the m high-confidence clusters, and the k low-confidence clusters. In some embodiments, the set of augmented clusters comprises the n general clusters, the m high-confidence clusters, and the k low-confidence clusters. In some of the noted embodiments, because the set of augmented clusters include clusters generated based at least in part on all of the prediction input data objects, based at least in part on a high-confidence subset of the prediction input data objects having relatively higher cluster confidence scores, and based at least in part on a low-confidence subset of the prediction input data objects having relatively low cluster confidence scores, the set of augmented clusters captures variations across prediction input data objects as a whole as well as across subsets of prediction input data objects, where the subsets may be determined based at least in part on estimated measures of predictive insightfulness of the input feature data associated with the prediction input data objects in the noted subsets.

At step/operation 407, the predictive data analysis computing entity 106 determines an augmented cluster score for each augmented cluster. The augmented cluster score for an augmented cluster may describe an estimated/predicted likelihood that state transition data associated with the prediction input data objects in the augmented cluster include patterns that will be of interest in generating input processing rules. In some embodiments, the augmented cluster score for an augmented cluster score is determined based at least in part on at least one of: (i) a feature correlation measure for the augmented cluster score, (ii) a cost variance measure for the augmented cluster score, and (iii) a type homogeneity measure for the augmented cluster. In some embodiments, the augmented cluster score for an augmented cluster score is determined based at least in part on the output of a machine learning model that is configured to process a feature correlation measure for the augmented cluster score, a cost variance measure for the augmented cluster score, and a type homogeneity measure for the augmented cluster.

In some embodiments, step/operation 407 may be performed in accordance with the process that is depicted in FIG. 5, which is an example process for determining the augmented cluster score for a particular augmented cluster score. The process that is depicted in FIG. 5 begins at step/operation 501 when the predictive data analysis computing entity 106 determines the feature correlation measure for the particular augmented cluster score. The feature correlation measure may describe an estimated/predicted likelihood that assignment of the augmented cluster score to a prediction input data object describes a cost measure associated with the prediction input data object. For example, in some embodiments, to determine the feature correlation measure for an augmented cluster, the predictive data analysis computing entity 106 first generates a random forest regressor machine learning model describing a set of decision trees, where each decision tree relates a set of features each describing assignment of an augmented cluster score to a prediction input data object to a cost measure classification for the prediction input data object. Afterward, the predictive data analysis computing entity 106 may generate an $R^2$ score for each augmented cluster based at least in part on the set of decision trees, and then determines the feature correlation measure for each augmented cluster based at least in part on the $R^2$ score for the augmented cluster. For example, as depicted in FIG. 6, the feature correlation measure 602 is determined for the cluster 601.

At step/operation 502, the predictive data analysis computing entity 106 determines the cost variance measure for the particular augmented cluster. The cost variance measure may describe variation of cost measures associated with a corresponding augmented cluster that may be determined based at least in part on one or more statistical distribution measures of cost measures associated with the corresponding augmented cluster. Examples of statistical distribution measures include centroid measures (e.g., mean measures, median measures, and/or the like), standard deviation measures, variance measures, mode measures, and/or the like. In some embodiments, the cost variance measure for an augmented cluster may be determined based at least in part on a ratio of: (i) a standard deviation of cost measures associated with the prediction input data objects to which the augmented cluster is assigned, and (ii) a mean of cost measures associated with the prediction input data objects to which the augmented cluster is assigned. For example, as depicted in FIG. 6, the cost variance measure 603 is determined for the cluster 601.

At step/operation 503, the predictive data analysis computing entity 106 determines the type homogeneity measure for the particular augmented cluster. The type homogeneity measure may describe an estimated/predicted degree of homogeneity in input types of prediction input data objects in the particular augmented cluster. In some embodiments, to determine the type homogeneity measure for a particular augmented cluster, the predictive data analysis computing entity 106 first determines an input type for each prediction input data object (e.g., a procedure type for each health insurance claim, a procedure code for each health insurance claim, a procedure group for each health insurance claim, and/or the like). Afterwards, the predictive data analysis computing entity 106 may determine the type homogeneity measure for the particular augmented cluster based at least in part on at least one input type frequency for at least one input type associated with the prediction input data object of the particular augmented cluster.

For example, the predictive data analysis computing entity 106 may determine the type homogeneity measure for the particular augmented cluster based at least in part on a ratio of: (i) a count of prediction input data objects associated with the particular augmented cluster that are associated with a most frequent input type, and (ii) a total count of prediction input data objects associated with the particular augmented cluster. In an exemplary embodiment, given an augmented cluster that is associated with a first health insurance claim having the procedure group P1, a second health insurance claim having the procedure group P2, and a third health insurance claim having the procedure group P1, the type homogeneity measure for the particular augmented cluster may be determined based at least in part on ⅔. For example, as depicted in FIG. 6, cluster 601 is associated with the most frequent procedure group 604 and the procedure group homogeneity measure 605.

At step/operation 504, the predictive data analysis computing entity 106 determines the augmented cluster score for the particular augmented cluster based at least in part on the feature correlation measure for the augmented cluster score, the cost variance measure for the augmented cluster score, and the type homogeneity measure for the augmented cluster. For example, in some embodiments, the augmented cluster score for the particular augmented cluster is a binary score that has an affirmative value if all three of the following conditions are satisfied and has a negative value otherwise: (i) the feature correlation measure for the particular augmented cluster score is among the type ath (e.g., $90^{th}$) percentile of the feature correlation measures for all augmented clusters, (ii) the cost variance measure for the particular augmented cluster score is among the type bth (e.g., $60^{th}$) percentile of the cost variance measures for all augmented clusters, and (iii) the type homogeneity measure for the particular augmented cluster is among the type cth (e.g., $75^{th}$) percentile of the type homogeneity measures for all augmented clusters. As another example, in some embodiments, the augmented cluster score for the particular augmented cluster is a binary score that has an affirmative value if at least x of the following conditions are satisfied and has a negative value otherwise: (i) the feature correlation measure for the particular augmented cluster score is among the type ath (e.g., $90^{th}$) percentile of the feature correlation measures for all augmented clusters, (ii) the cost variance measure for the particular augmented cluster score is among the type bth (e.g., $60^{th}$) percentile of the cost variance measures for all augmented clusters, and (iii) the type homogeneity measure for the particular augmented cluster is among the type cth (e.g., $75^{th}$) percentile of the type homogeneity measures for all augmented clusters.

Returning to FIG. 4, at step/operation 408, the predictive data analysis computing entity 106 determines one or more filtered clusters based at least in part on each augmented cluster score. In some embodiments, the predictive data analysis computing entity 106 determines the one or more filtered clusters based at least in part on a subset of the augmented clusters having an affirmative augmented cluster score. In some embodiments, the predictive data analysis computing entity 106 determines the one or more filtered clusters based at least in part on a subset of the augmented clusters having an augmented cluster score that satisfies (e.g., exceeds) an augmented cluster score threshold.

At step/operation 409, the predictive data analysis computing entity 106 determines one or more probabilistic rules based at least in part on the filtered clusters. In some embodiments, a probabilistic rule may be an input processing rule that describes a likelihood that satisfaction of one or more conditions defined by one or more input feature values will lead to transition to a defined operational state (e.g., a defined business process stage, a defined business process interception, a defined pend code, and/or the like). For example, an example of an logical if-statement describing three probabilistic rules is: IF specialty='chiropractic' AND p.o.s.='Clinic' THEN $S_1$ probability: 95%, ELSE IF specialty='chiropractic' and p.o.s.='Outpatient Surgery' THEN $S_2$ probability: 88%, ELSE $S_3$ probability: 75%, where each S factor is a defined operational state. In some embodiments, to determine probabilistic rules based at least in part on a filtered cluster, data related to recorded state transitions of the prediction input data objects are modeled using a Markov chain model to identify high-probability state transitions, then a transition reward measure is determined for each high-probability state transition by computing solutions to a linear equation model that relates high-probability state transitions to transition reward measures for the high-probability state transitions, then high-variability operational states are determined based at least in part on the transition reward measures, and then transition reward measures for the defined operational transitions associated with the high-variability operational states are processed using a Bayesian rules list introspection model to generate the probabilistic rules.

In some embodiments, step/operation 409 may be performed in accordance with the process that is depicted in FIG. 7, which is an example process for determining a set of probabilistic rules based at least in part on a set of filtered clusters. At step/operation 701, the predictive data analysis computing entity 106 determines one or more recorded state transition paths for the filtered clusters. A recorded state transition path may describe a sequence of one or more continuous state transitions performed by at least prediction input data object that is in a filtered cluster. For example, a recorded state transition may describe that a subset of prediction input data objects modeled by a filtered cluster have transitioned from a defined operational state $S_1$ to a defined operational state $S_2$, then from the defined operational state $S_2$ to a defined operational state $S_3$, and then from the defined operational state $S_1$ to a defined operational state $S_4$. In some embodiments, each recorded state transition path is associated with an initial operational state (e.g., the defined operational state $S_1$ in the preceding example), a terminal operational state (e.g., the defined operational state $S_4$ in the preceding example), a sequence of recorded state transitions that are referred to as the path-specific subset of defined state transitions for the recorded state transition path (e.g., the recorded state transition $S_1 \rightarrow S_2$, the recorded state transition $S_2 \rightarrow S_3$, and the recorded state transition $S_3 \rightarrow S_4$ in the preceding example). Accordingly, in some embodiments, a recorded state transition path describes that at least one prediction input data object in a filtered cluster has been recorded to have transitioned from an initial operational state of a plurality of defined operational states to a terminal operational state of the plurality of defined operational states via a path-specific transition subset of a plurality of defined state transitions, where each defined state transition is a defined direct transition from a first operational state (e.g., the defined operational state $S_1$ for the recorded state transition $S_1 \rightarrow S_2$ in the preceding example) of the plurality of defined operational states to a second operational state (e.g., the defined operational state $S_2$ for the recorded state transition $S_1 \rightarrow S_2$ in the preceding example) of the plurality of defined operational states.

In some embodiments, given a set of defined operational states, a subset of defined operational states are defined to be potential initial operational states (e.g., a defined operational state defining receipt of an input processing query and/or a defined operational state defining a customer follow-up request), and a subset of defined operational states are defined to be potential terminal operational states (e.g., a defined operational state defining completion of an input processing routine and/or a defined operational state defining a customer satisfaction). In some of the noted embodiments, a recorded state transition path is sequence of one or more continuous state transitions performed by at least prediction input data object that is in a filtered cluster, where the sequence begins with a potential initial operational state and terminates with a potential terminal operational state. In some embodiments, given s defined operational states, up to s*s defined state transitions may be defined, where each defined state transition may describe a direct transition from a first defined operational state of the s defined operational states to a second defined operational state of the s defined operational states. Accordingly, defined state transitions may include state transitions that are not part of any recorded state transition paths, and as such the set of recorded state transitions as described herein may be a proper subset of the defined state transitions. In some embodiments, given a particular recorded state transition path, the set of defined state transitions that occur within the particular recorded state transition path are referred to herein as the path-specific transition subset of a plurality of defined state transitions for the particular recorded state transition path.

At step/operation 702, the predictive data analysis computing entity 106 determines a transition probability score for each defined state transition. The transition probability score may describe an estimated/predicted likelihood that a prediction input data object in a first operational state that is associated with a corresponding defined state transition for the probability score transitions to the second operational state that is associated with the corresponding defined state transition. For example, the transition probability score for a defined state transition that describes a direct transition from a first defined operational state to a second defined operational state may describe an observed/computed ratio of: (i) a count of a first subset of a set of prediction input data objects that have been recorded to be at the first defined operational state, and (ii) a count of a subset of the first subset that have been recorded to have directly transitioned from the first defined operational state to the second operational state. As another example, the transition probability score for a defined state transition that describes a direct transition from a first defined operational state to a second defined operational state may describe an observed/computed ratio of: (i) a count of instances in which a set of prediction input data objects have been recorded to be at the first defined operational state, and (ii) a count of a subset of the noted instances in which a direct transition to the second defined operational state has been performed.

An operational example of a set of transition probability scores is depicted as edge weights in the state transition modeling graph 800 of FIG. 8. As depicted in FIG. 8, each edge weight describes the transition probability score for a defined state transition from the first defined operational state that is associated with the corresponding directed edge to the second defined operational state that is associated with the corresponding directed edge. For example, as depicted in FIG. 8, the transition probability score for the defined state transition from the defined operational state X9 to the defined operational state 9A is 1.0.

At step/operation 703, the predictive data analysis computing entity 106 determines a path probability score for each recorded state transition based at least in part on each transition probability score for the path-specific transition subset for the recorded transition path. The transition probability score may describe an estimated/predicted likelihood that a prediction input data object in an initial operational state of a corresponding recorded state transition will transition to a terminal operational state of the corresponding recorded state transition via the defined state transitions in the path-specific transition subset for the corresponding recorded transition path. In some embodiments, the transition probability score for a corresponding recorded state transition may be calculated by combining (e.g., multiplying, computing a joint probability of, and/or the like) the transition probability scores for the defined state transitions in the path-specific transition subset for the corresponding recorded transition path. For example, given p defined state transitions in a path-specific transition subset for a corresponding recorded transition path which are associated with p corresponding transition reward measures, embodiments, the transition probability score for the corresponding recorded state transition may be calculated by combining (e.g., multiplying, computing a joint probability of, and/or the like) the p transition probability scores for the p defined state transitions in the path-specific transition subset for the corresponding recorded transition path.

At step/operation 704, the predictive data analysis computing entity 106 determines one or more high-probability state transitions based at least in part on each probability score. In some embodiments, the predictive data analysis computing entity 106 first determines a set of high-probability state transition paths whose corresponding path probability scores satisfy a state transition path threshold. Afterward, the predictive data analysis computing entity 106 identifies the high-probability state transitions as those defined state transitions that are in t (e.g., at least one, all of, and/or the like) path-specific transition subsets for the set of high-probability state transition paths. In some embodiments, given q high-probability state transition paths that are associated with q path-specific subsets, a defined state transition is deemed to be a high-probability state transition if it is within at least t of the q path-specific subsets (i.e., it falls within at least t of the q high-probability state transition paths).

At step/operation 705, the predictive data analysis computing entity 106 determines a transition reward measure for each high-probability state transition. In some embodiments, a transition reward measure describes an estimated/computed utility ratio (e.g., cost/value ratio) for a high-probability state transition. In some embodiments, the transition reward measure for a high-probability state transition using a system of equations, for example the system of equations characterized by the equations: $X_1=S_1 \rightarrow S_2$, $X_2=S_2 \rightarrow S_3$, $X_3=S_3 \rightarrow S_4$, $X_4=S_1 \rightarrow S_3$, $X_n=S_{n-1} \rightarrow S_n$, $X_1+X_2+X_n=Y_1$, $X_4+X_3=Y_2$, $X_1+X_2+X_3+X_4=Y_3$, where each S factor is a defined operational state, each X factor is a transition reward measure for a defined state transition, and each Y factor is a reward measure for a state transition path.

At step/operation 706, the predictive data analysis computing entity 106 determines a reward variability measure for each defined operational state. The reward variability measure may describe a measure of variability of transition reward measures for an originating subset of a set of more high-probability state transitions that originate from a defined operational state. For example, if a defined operational state is associated with v high-probability state transitions that originate from the defined operational state (i.e., if the defined operational state is the first operational state for v defined state transitions that are determined to have a threshold-satisfying transition probability scores), then the reward variability measure for the defined operational state may describe a measure of variability (e.g., a variance measure, a standard deviation measure, and/or the like) of the v corresponding transition reward measures for the noted v defined state transitions.

At step/operation 707, the predictive data analysis computing entity 106 determines the probabilistic rules based at least in part on a high-variability subset of the defined operational states (i.e., a subset of the defined operational states whose corresponding reward variability measures satisfy a reward variability measures threshold). In some embodiments, to perform step/operation 707, the predictive data analysis computing entity 106 first determines a high-variability subset of the plurality of defined operational states based at least in part on each reward variability measure; then determines, for each defined operational state in the high-variability subset, a probabilistic rule set based at least in part on the originating subset for the defined operational state and each transition probability score for the originating subset; and then determines the probabilistic rules based at least in part on each probabilistic rule set. In some embodiments, to perform step/operation 707, the predictive data analysis computing entity 106 processes transition reward measures that are associated with defined state transitions that are associated with at least w (e.g., at least one) high-variability defined operational state using a Bayesian rules list introspection model to generate the probabilistic rules. In some embodiments, a Bayesian rules list introspection model can be implemented in accordance with at least some of the techniques described in Letham et al., *Interpretable Classifiers using Rules and Bayesian Analysis: Building a Better Stroke Prediction Model* (2015), available online at https://arxiv.org/abs/1511.01644.

Returning to FIG. 4, at step/operation 410, the predictive data analysis computing entity 106 determines one or more regressor-based rules based at least in part on the filtered clusters. In some embodiments, performing the step/operation 410 comprises determining, based at least in part on each prediction input data object that is associated with a filtered cluster and using a RuleFit regressor machine learning model, one or more inferred rules; and determining based at least in part on the one or more inferred rules, the one or more input processing rules. In some embodiments, a RuleFit regressor machine learning model can be implemented in accordance with at least some of the techniques described in Molnar RuleFit in Interpretable Machine Learning: A Guide for Making Black Box Models Explainable (2021), available online at https://christophm.github.io/interpretable-ml-book/preface-by-the-author.html. An example of a regressor-based rule is the rule Src_chrg_amt<=600 and orig_fp_manual_flag<=0.5 and orig_adjusted_manual_flag<=0.5: coef=5.3, support=0.90.

Accordingly, various embodiments of the present invention address technical challenges associated with performing predictive data analysis operations using rules engines. Rules engines provide interpretable solutions for performing predictive data analysis that are often computationally superior to other predictive data analysis frameworks as they can perform predictive data analysis with linear computational complexity given a variable number of rules. However, creating such rules engines can be computationally costly and practically difficult. Accordingly, various embodiments of the present invention introduce techniques for generating rules engines using probabilistic clustering techniques. In doing so, various embodiments of the present invention introduce innovative solutions that improve computational efficiency and interpretability of performing predictive data analysis operations.

At step/operation 411, the predictive data analysis computing entity 106 performs one or more prediction-based actions based at least in part on the set of input processing rules that comprise the probabilistic rules and the regressor-based rules. In some embodiments, performing the one or more prediction-based actions comprises automatically performing one or more input processing operations based at least in part on the input processing rules and using the output of the input processing operations to perform one or more operational load balancing operations. In some embodiments, performing the one or more prediction-based actions comprises generating user interface data for a prediction output user interface that describes a recommended state transition for a particular prediction input data object as well as recommendation metadata that describe the set of input processing rules used to generate the recommendation. For example, as depicted in FIG. 9, the prediction output user interface 900 recommends that the claim associated with the claim ID 122445 should be transitioned to state $S_1$, with the explanatory metadata 901 describing why the recommendation is being generated given the probabilistic rules defined via various techniques described herein.

As described above, various embodiments of the present invention address technical challenges associated with performing predictive data analysis operations using rules engines. Rules engines provide interpretable solutions for performing predictive data analysis that are often computationally superior to other predictive data analysis frameworks as they can perform predictive data analysis with linear computational complexity given a variable number of rules. However, creating such rules engines can be computationally costly and practically difficult. Accordingly, various embodiments of the present invention introduce techniques for generating rules engines using probabilistic clustering techniques. In doing so, various embodiments of the present invention introduce innovative solutions that improve computational efficiency and interpretability of performing predictive data analysis operations.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
 applying, by one or more processors, a probabilistic clustering routine to identify a set of general clusters from a plurality of prediction input data objects;
 determining, by the one or more processors, a set of general cluster association scores for a prediction input data object of the plurality of prediction input data objects, wherein a general cluster association score of the set of general cluster association scores comprises a predicted likelihood of association between the prediction input data object and a general cluster of the set of general clusters;
 determining, by the one or more processors, a clustering confidence score for the prediction input data object based at least in part on a highest general cluster association score of the set of general cluster association scores associated with the prediction input data object;
 determining, by the one or more processors, a high-confidence subset of the plurality of prediction input data objects based at least in part on the clustering confidence score and a first clustering confidence score condition;

determining, by the one or more processors, a set of high-confidence clusters based on the high-confidence subset of the plurality of prediction input data objects;

determining, by the one or more processors, a plurality of augmented clusters comprising the set of general clusters and the set of high-confidence clusters, wherein an augmented cluster of the plurality of augmented clusters captures a variation across the plurality of prediction input data objects;

determining, by the one or more processors, an augmented cluster score for an augmented cluster of the plurality of augmented clusters;

determining, by the one or more processors, a filtered cluster from the plurality of augmented clusters based at least in part on the augmented cluster score and an augmented cluster score condition;

generating, by the one or more processors and using a regressor model, an input processing rule based at least in part on the filtered cluster;

providing, by the one or more processors, the input processing rule for processing a future prediction input data object not included in the plurality of prediction input data objects, performing, based on the provided input processing rule, at least one input processing operation; and using an output of the input processing operation to perform one or more load balancing operations.

2. The computer-implemented method of claim 1, wherein determining the plurality of augmented clusters further comprises:
determining a low-confidence subset of the plurality of prediction input data objects based at least in part on the clustering confidence score for the prediction input data object satisfying a second clustering confidence score condition;
identifying a set of low-confidence clusters of the low-confidence subset; and
determining the plurality of augmented clusters based at least in part on the set of low-confidence clusters.

3. The computer-implemented method of claim 1, wherein determining the augmented cluster score for the augmented cluster comprises:
determining an input feature set and a cost measure for the prediction input data object;
determining a feature correlation measure for the augmented cluster based at least in part on the input feature set and the cost measure; and
determining the augmented cluster score based at least in part on the feature correlation measure.

4. The computer-implemented method of claim 1, wherein determining the augmented cluster score for the augmented cluster comprises:
determining a cost measure for the prediction input data object;
determining a statistical distribution measure using the cost measure associated with the augmented cluster;
determining a cost variance measure for the augmented cluster based at least in part on the statistical distribution measure; and
determining the augmented cluster score based at least in part on the cost variance measure.

5. The computer-implemented method of claim 1, wherein determining the augmented cluster score for the augmented cluster comprises:

determining an input type for the prediction input data object;
determining a type homogeneity measure for the augmented cluster based at least in part on the input type; and
determining the augmented cluster score based at least in part on the type homogeneity measure.

6. The computer-implemented method of claim 1, wherein generating the input processing rule comprises:
determining a recorded state transition path, wherein: (i) the recorded state transition path describes a path-specific state transition of the prediction input data object in the filtered cluster from an initial operational state comprising a first defined operational state to a terminal operational state comprising a second defined operational state;
for the recorded state transition, determining a transition probability score based at least in part on a relative frequency of first recorded transitions from the first operational state for a defined state transition to the second operational state for the defined state transition among second recorded transitions to the second operational state from any defined operational state;
determining a path probability score based at least in part on the transition probability score for a path-specific transition subset for a recorded transition path;
determining a high-probability state transition path based at least in part on the path probability score;
determining a high-probability state transition associated with the high-probability state transition path; and
generating the input processing rule based at least in part on the high-probability state transition.

7. The computer-implemented method of claim 6, wherein generating the input processing rule based at least in part on the high-probability state transition comprises:
for the high-probability state transition, determining a transition reward measure;
for a defined operational state, determining a reward variability measure of the transition reward measure for the high-probability state transition that originates from the defined operational state;
determining a high-variability defined operational state based at least in part on the reward variability measure;
for the high-variability defined operational state determining a probabilistic rule set; and
determining the one or more input processing rules based at least in part on the probabilistic rule set.

8. The computer-implemented method of claim 1, wherein generating the input processing rule comprises:
determining, based at least in part on the prediction input data object that is associated with the filtered cluster and using the regressor model, an inferred rule; and
generating, based at least in part on the inferred rule, the input processing rule.

9. A system comprising:
one or more processors; and
one or more memories storing processor-executable instructions that, when executed by the one or more processors, cause the one or more processors to perform operations comprising:
applying, by one or more processors, a probabilistic clustering routine to identify a set of general clusters from a plurality of prediction input data objects;
determining, by the at least one processor, a set of general cluster association scores for a prediction input data object of the plurality of prediction input data objects, wherein a general cluster association score of the set of general cluster association scores comprises a predicted likelihood of association between the prediction input data object and a general cluster of the set of general clusters;

determining, by the at least one processor, a clustering confidence score for the prediction input data object based at least in part on a highest general cluster association score of the set of general cluster association scores associated with the prediction input data object;

determining, by the at least one processor, a high-confidence subset of the plurality of prediction input data objects based at least in part on the clustering confidence score and a first clustering confidence score condition;

determining, by the at least one processor, a set of high-confidence clusters based on the high-confidence subset of the plurality of prediction input data objects;

determining, by the at least one processor, a plurality of augmented clusters comprising the set of general clusters and the set of high-confidence clusters, wherein an augmented cluster of the plurality of augmented clusters captures a variation across the plurality of prediction input data objects;

determining, by the at least one processor, an augmented cluster score for an augmented cluster of the plurality of augmented clusters;

determining, by the at least one processor, a filtered cluster from the plurality of augmented clusters based at least in part on the augmented cluster score and an augmented cluster score condition;

generating, by the at least one processor and using a regressor model, an input processing rule based at least in part on the filtered cluster;

providing, by the at least one processor, the input processing rule for processing a future prediction input data object not included in the plurality of prediction input data objects, performing, based on the provided input processing rule, at least one input processing operation; and using an output of the input processing operation to perform one or more load balancing operations.

10. The system of claim 9, wherein determining the plurality of augmented clusters further comprises:

determining a low-confidence subset of the plurality of prediction input data objects based at least in part on the clustering confidence score for the prediction input data object satisfying a second clustering confidence score condition;

identifying a set of low-confidence clusters of the low-confidence subset; and determining the plurality of augmented clusters based at least in part on the set of low-confidence clusters.

11. The apparatus of claim 9, wherein determining the augmented cluster score for the augmented cluster comprises:

determining an input feature set and a cost measure for the prediction input data object;

determining a feature correlation measure for the augmented cluster based at least in part on the input feature set and the cost measure; and determining the augmented cluster score based at least in part on the feature correlation measure.

12. The apparatus of claim 9, wherein determining the augmented cluster score for the augmented cluster comprises:

determining a cost measure for the prediction input data object;

determining a statistical distribution measure using the cost measure associated with the augmented cluster;

determining a cost variance measure for the augmented cluster based at least in part on the statistical distribution measure; and determining the augmented cluster score based at least in part on the cost variance measure.

13. The apparatus of claim 9, wherein determining the augmented cluster score for the augmented cluster comprises:

determining an input type for the prediction input data object;

determining a type homogeneity measure for the augmented cluster based at least in part on the input type; and determining the augmented cluster score based at least in part on the type homogeneity measure.

14. The system of claim 9, wherein generating the input processing rule comprises:

determining a recorded state transition path, wherein: (i) the recorded state transition path describes a path-specific state transition of the prediction input data object in the filtered cluster from an initial operational state comprising a first defined operational state to a terminal operational state comprising a second defined operational state;

for the recorded state transition, determining a transition probability score based at least in part on a relative frequency of first recorded transitions from the first operational state for a defined state transition to the second operational state for the defined state transition among second recorded transitions to the second operational state from any defined operational state;

determining a path probability score based at least in part on the transition probability score for a path-specific transition subset for a recorded transition path;

determining a high-probability state transition path based at least in part on the path probability score;

determining a high-probability state transition associated with the high-probability state transition path; and generating the input processing rule based at least in part on the high-probability state transition.

15. The system of claim 14, wherein generating the input processing rule based at least in part on the high-probability state transition comprises:

for the high-probability state transition, determining a transition reward measure;

for a defined operational state, determining a reward variability measure of the transition reward measure for the high-probability state transition that originates from the defined operational state;

determining a high-variability defined operational state based at least in part on the reward variability measure;

for the high-variability defined operational state, determining a probabilistic rule set; and determining the one or more input processing rules based at least in part on the probabilistic rule set.

16. The system of claim 9, wherein generating the input processing rule comprises:

determining, based at least in part on the prediction input data object that is associated with the filtered cluster and using the regressor model, an inferred rule; and generating, based at least in part on the inferred rule, the input processing rule.

17. One or more non-transitory computer-readable media storing processor-executable instructions that, when executed by one or more processors, cause the one or more processors to perform operations comprising:
- applying, by one or more processors, a probabilistic clustering routine to identify a set of general clusters from a plurality of prediction input data objects;
- determining, by the at least one processor, a set of general cluster association scores for a prediction input data object of the plurality of prediction input data objects, wherein a general cluster association score of the set of general cluster association scores comprises a predicted likelihood of association between the prediction input data object and a general cluster of the set of general clusters;
- determining, by the at least one processor, a clustering confidence score for the prediction input data object based at least in part on a highest general cluster association score of the set of general cluster association scores associated with the prediction input data object;
- determining, by the at least one processor, a high-confidence subset of the plurality of prediction input data objects based at least in part on the clustering confidence score and a first clustering confidence score condition;
- determining, by the at least one processor, a set of high-confidence clusters based on the high-confidence subset of the plurality of prediction input data objects;
- determining, by the at least one processor, a plurality of augmented clusters comprising the set of general clusters and the set of high-confidence clusters, wherein an augmented cluster of the plurality of augmented clusters captures a variation across the plurality of prediction input data objects;
- determining, by the at least one processor, an augmented cluster score for an augmented cluster of the plurality of augmented clusters;
- determining, by the at least one processor, a filtered cluster from the plurality of augmented clusters based at least in part on the augmented cluster score and an augmented cluster score condition;
- generating, by the at least one processor and using a regressor model, an input processing rule based at least in part on the filtered cluster;
- providing, by the at least one processor, the input processing rule for processing a future prediction input data object not included in the plurality of prediction input data objects,
- performing, based on the provided input processing rule, at least one input processing operation; and
- using an output of the input processing operation to perform one or more load balancing operations.

18. The one or more non-transitory computer-readable media of claim 17, wherein determining the plurality of augmented clusters further comprises:
- determining a low-confidence subset of the plurality of prediction input data objects based at least in part on the clustering confidence score for the prediction input data object satisfying a second clustering confidence score condition;
- identifying a set of low-confidence clusters of the low-confidence subset; and
- determining the plurality of augmented clusters based at least in part on the set of low-confidence clusters.

19. The computer program product of claim 17, wherein determining the augmented cluster score for the augmented cluster comprises:
- determining an input feature set and a cost measure for the prediction input data object;
- determining a feature correlation measure for the augmented cluster based at least in part on the input feature set and the cost measure; and
- determining the augmented cluster score based at least in part on the feature correlation measure.

20. The one or more non-transitory computer-readable media of claim 17, wherein generating the input processing rule comprises:
- determining a recorded state transition path, wherein: (i) the recorded state transition path describes a path-specific state transition of the prediction input data object in the filtered cluster from an initial operational state comprising a first defined operational state to a terminal operational state comprising a second defined operational state;
- for the recorded state transition, determining a transition probability score based at least in part on a relative frequency of first recorded transitions from the first operational state for a defined state transition to the second operational state for the defined state transition among second recorded transitions to the second operational state from any defined operational state;
- determining a path probability score based at least in part on the transition probability score for a path-specific transition subset for a recorded transition path;
- determining a high-probability state transition path based at least in part on the path probability score;
- determining a high-probability state transition associated with the high-probability state transition path; and
- generating the input processing rule based at least in part on the high-probability state transition.

* * * * *